United States Patent [19]

Pringle et al.

[11] Patent Number: 4,569,406
[45] Date of Patent: Feb. 11, 1986

[54] COMBINATION WEIGHING MACHINE HAVING VOLUME CONFINING FUNCTION

[75] Inventors: Frank E. Pringle, Sheboygan, Wis.; Shinichi Inoue, Kobe, Japan

[73] Assignee: Yamato Scale Company, Limited, Japan

[21] Appl. No.: 653,863

[22] Filed: Sep. 21, 1984

[30] Foreign Application Priority Data

Sep. 28, 1983 [JP] Japan .................................. 58-181454
Jan. 6, 1984 [JP] Japan .................................... 59-1030

[51] Int. Cl.⁴ ............................................ G01G 19/22
[52] U.S. Cl. .......................................... 177/25; 177/1; 177/58
[58] Field of Search ................................ 177/1, 25, 58

[56] References Cited

U.S. PATENT DOCUMENTS

| | | | |
|---|---|---|---|
| 4,385,671 | 5/1983 | Hirano | 177/25 |
| 4,388,975 | 6/1983 | Hirano | 177/25 |
| 4,494,619 | 1/1985 | Matsuno | 177/25 |
| 4,520,883 | 6/1985 | Fukuda | 177/25 X |

Primary Examiner—George H. Miller, Jr
Attorney, Agent, or Firm—Senniger, Powers, Leavitt and Roedel

[57] ABSTRACT

A combination weighing machine having a plurality of weighing units and being adopted to load at least one of the weighing units with articles having a predetermined volume, to compare the weight signal from this weighing unit with a predetermined reference weight signal and to deliver the articles of the predetermined weight if their weight is greater than the reference weight. If the weight of such articles is less than the reference weight the machine is operable to generate combinations of the aforesaid; weight signal and the weight signals from the other weighing units to select a combination having a weight greater than the reference weight, for the purpose of forming batches of articles each having volume and weight greater than predetermined values.

15 Claims, 8 Drawing Figures

COMBINATION WEIGHING MACHINE HAVING VOLUME CONFINING FUNCTION

This invention relates to a combination weighing machine, especially, to such machine for delivering batches of articles each having a volume and weight greater than predetermined values.

When packing flaky articles such as cornflakes in bags, it is sometimes requested that the articles in each bag be above a predetermined value not only in their weight, but also in their volume. This is because such articles are fragile and, if crushed, are less in volume and lower in commercial value, even if their weight is acceptable. As disclosed, for example, in U.S. Pat. No. 3,939,928, the combination weighing machine is arranged to weigh articles by a plurality of weighing units at the same time and combine the resultant weight values in various fashion to select a combination the total weight of which satisfies a predetermined condition. However, the selected combination cannot be loaded with volume condition in general, even though it satisfies the weight condition. U.S. Pat. No. 4,388,975 discloses a special combination weighing machine which can cause at least one of a plurality of weighing units to participate always in the selected combination. This machine is designed always to mix some specific kind of articles in the selected combination. In such case as above, where the selected combination must have a volume greater than a predetermined value, the object can be attained by loading the weighing unit always participating in the selected combination with articles which have previously been measured out to have about a predetermined volume. In this case, however, if the articles having been measured out satisfy the weight condition by themselves, the object can be attained only by delivering these articles and there is no need to generate additional combinations, which would only be a waste of time.

Accordingly, an object of this invention is to provide a combination weighing machine which can weigh out articles having a volume above a predetermined value and satisfying a predetermined weight condition, without waste of time as above.

While the combination weighing machine according to this invention includes a plurality of weighing units each adapted for weighing articles to produce corresponding weight signals, means for effecting combination operation of the weight signals, means for comparing the resultant sum weights of combinations with a predetermined weight condition to decide whether they are acceptable or not, and means for unloading and loading those weighing units having participated in the accepted combination. As a feature of this invention, at least one of the plurality of weighing units always participates in the selected combination, as in the device disclosed in the above U.S. Pat. No. 4,388,975. Means is provided for comparing the weight signal from the weighing unit always participating with the above weight condition to decide its acceptability and, if acceptable, unloading and loading this weighing unit but, if unacceptable, actuating the above combination operation means, and comparing means.

Other objects and features of this invention will be described in more detail hereinunder with reference to the accompanying drawings.

In the drawings.

Throughout the drawings, the same reference numerals are given to equivalent structural components.

Figure 1:
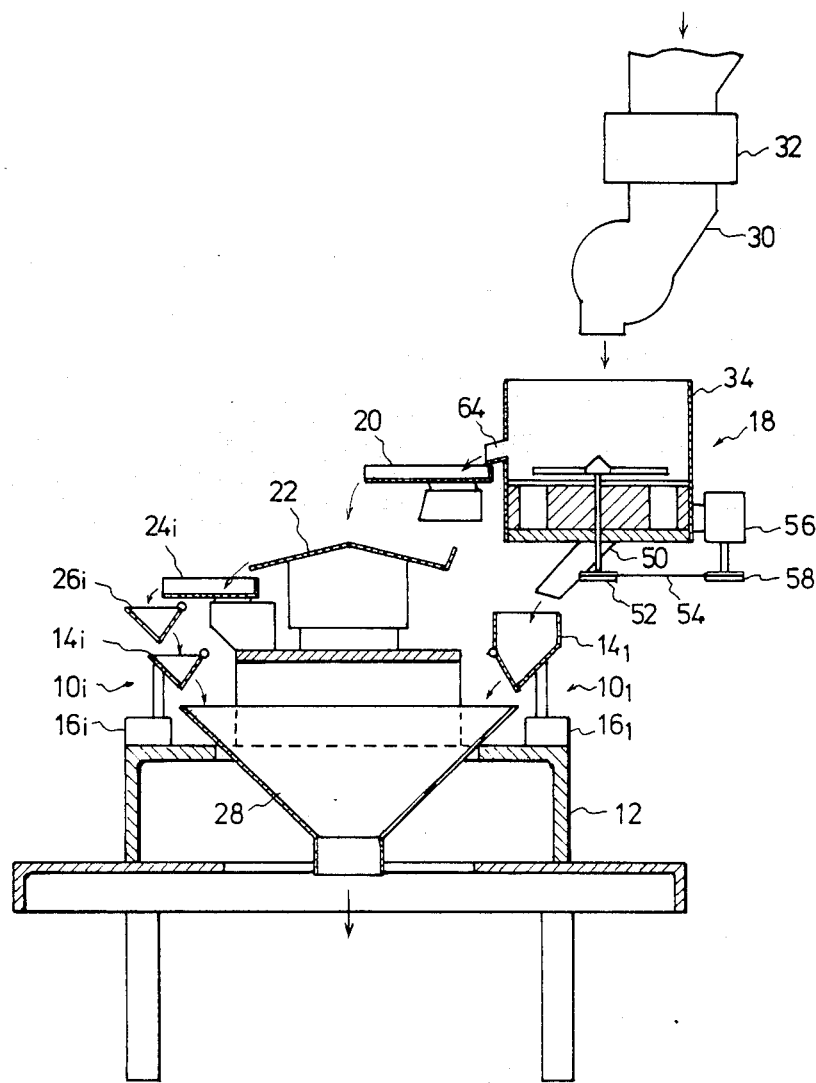
FIG. 1 is a partially sectional schematic side view representing a mechanical configuration of an embodiment of the combination weighing machine according to this invention.

Referring to FIG. 1, the combination weighing machine includes weighing units $10_a$, $10_b$, $10_1$, $10_2$, ... $10_i$, ... $10_n$ arranged circularly on a frame 12 and provided with weighing hoppers $14_a$, $14_b$, $14_1$, $14_2$, ... $14_n$ and weight sensors $16_a$, $16_b$, $16_1$, $16_2$, ... $16_n$, respectively. Two of these weighing units, $10_a$ and $10_b$, are provided with weighing hoppers $14_a$ and $14_b$, respectively, which are substantially greater in volume than those of the other units and, as described later, loaded with articles having a predetermined volume by a common constant volume feeding device 18. The articles are also fed from the feeding device 18 through a vibration conveyer 20 to the central portion of a conical distribution feeder 22, and further supplied through vibration conveyers $24_1$, ... $24_i$, ... $24_n$ and holding hoppers $26_1$, ... $26_i$, ... $26_n$ to the weighing hoppers $14_1$, ... $14_i$, ... $14_n$, respectively. A common collection chute 28 is located under the weighing hoppers 14 for collecting the articles discharged from the selected weighing units to deliver them to a packing machine (not shown). Supply of the articles to the constant volume feeding device 18 is effected by a feeding machine 30 provided with a crusher 32 to be described later.

Figure 2:
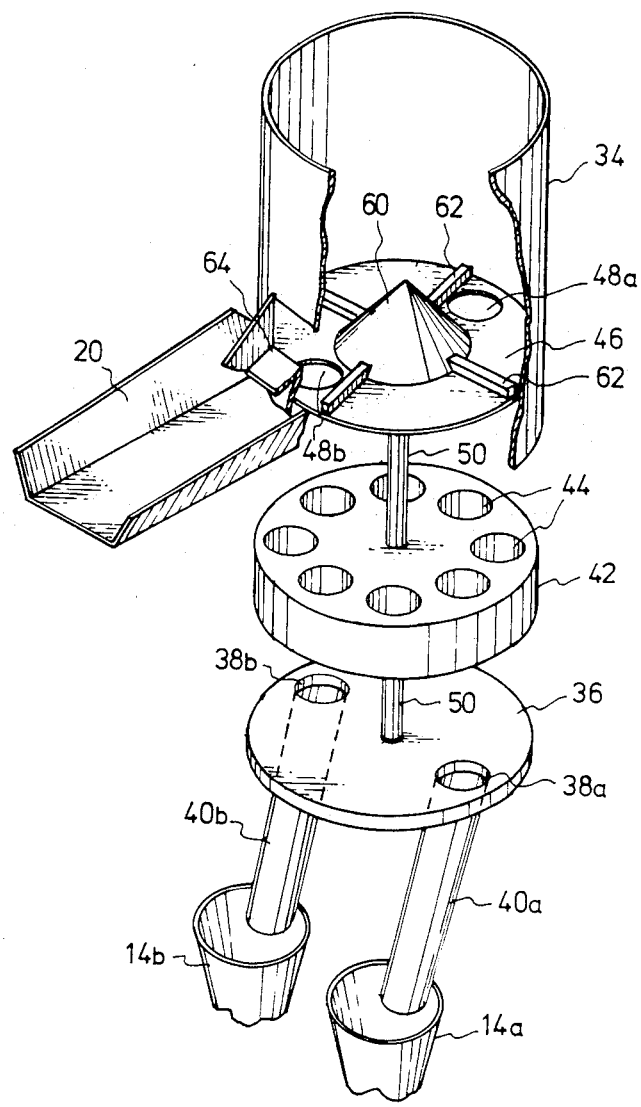
FIG. 2 is a partially broken-away exploded perspective view representing a constant volume feeding device used in the embodiment of FIG. 1.

As shown in detail in FIG. 2, the constant volume feeding device 18 includes a cylindrical tank 34 having a bottom plate 36 in which a pair of through-holes $38_a$ and $38_b$ are formed at 180° interval. The holes $38_a$ and $38_b$ communicate with the weighing hoppers $14_a$ and $14_b$, respectively, by tubular chutes $40_a$ and $40_b$. On the bottom plate 36, there is a concentric thick volumetric disc or cylinder 42 having an even number (eight, in this embodiment) of cylindrical through-holes 44 which can register with the holes $38_a$ and $38_b$ of the bottom plate 36. The volumetric disc 42 is designed such that the volume of each hole 44 is equal to one half of the lower threshold of the abovementioned predetermined volume of articles. On the volumetric disc 42, there is a top plate 46 having a pair of through-holes $48_a$ and $48_b$ which are similar to the holes $38_a$ and $38_b$ of the bottom plate 36 but angularly displaced therefrom by about 90°. The bottom and top plates 36 and 46 are fixed to the tank 34, while the volumetric disc 42 can move slidingly between the both plates. The volumetric disc 42 is fixed at its center to a shaft 50 and a pulley 52 fixed to the lower end of the shaft 50 is coupled through a belt 54 to a pulley 58 of a motor 56 (see, FIG. 1). The motor 56 includes a suitable reduction gear device and rotates the volumetric disc 42 by one pitch (the angle between the adjoining holes 44) in response to a driving signal which will be described later. A conical cap 60 having four vanes 62 is fixed to the top of the shaft 50 for rotating with the disc 42 to stir the articles in the tank 34 for preventing retardation. The side wall of the tank 34 has an exit port 64 just above the top plate 46, which opens just above the vibration conveyer trough 20. Accordingly, when the shaft 50 is driven in such a state that a suitable amount of articles have been fed in the tank 34 from the feeder 30, the vanes 62 rotate with the volumetric disc 42 to stir the articles in the tank 34 and the articles fall in the volumetric holes 44 when they register with the holes $48_a$ and $48_b$ of the top plate 46 and then fall in the weighing hoppers $14_a$ and $14_b$ through the chutes $40_a$ and $40_b$ when the holes 44 register with the holes $38_a$ and $38_b$ of the bottom plate 36. At the same time, the articles in the tank 34 stirred by the vanes 62 fall down onto the conveyer trough 20 from the exit port 64 by gravity and are successively conveyed to the dispersion feeder 22.

Figure 3:
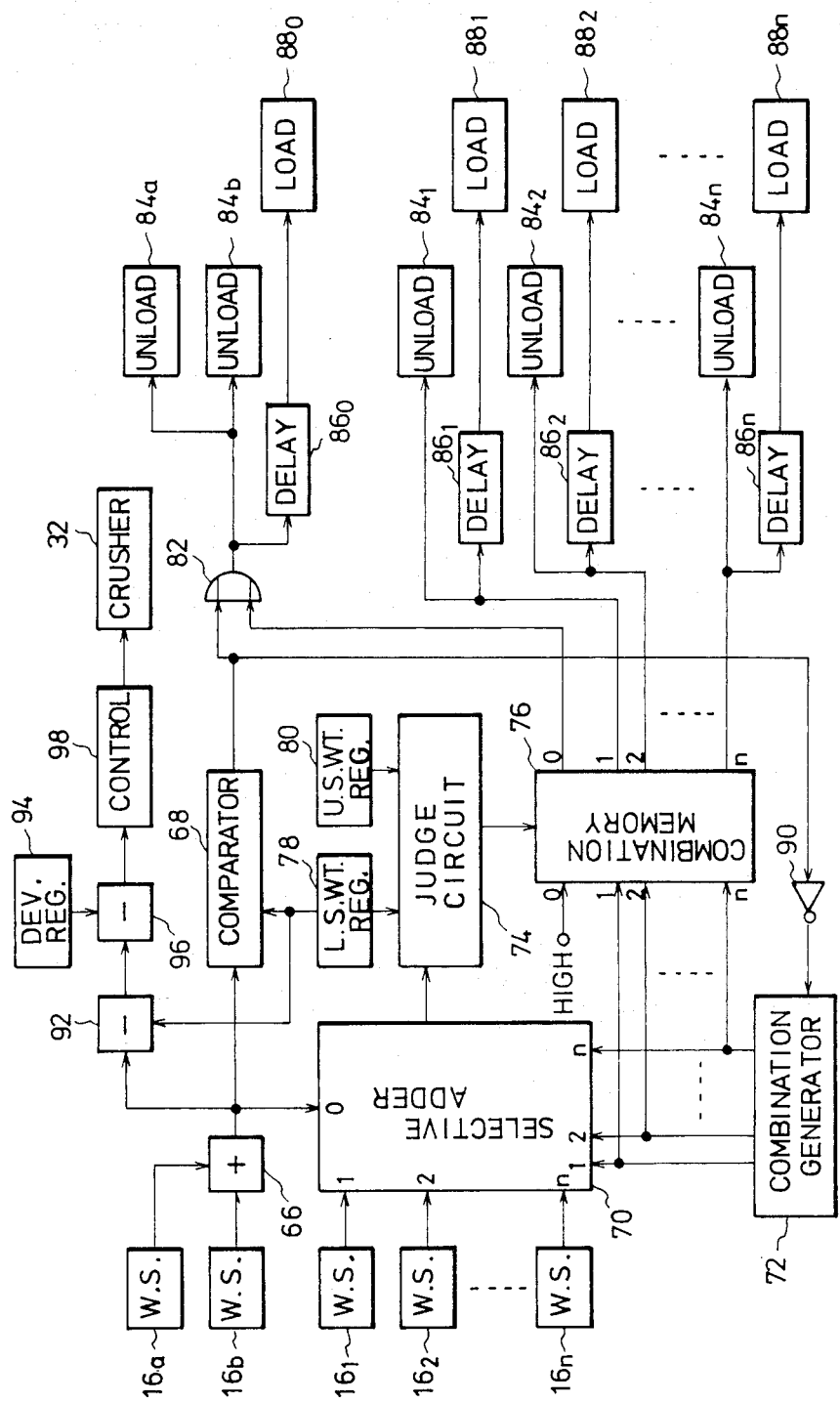
FIG. 3 is a block circuit diagram representing an electrical configuration of the embodiment of FIG. 1.

Referring to FIG. 3, weight signals generated by the weight sensors $16_a$ and $16_b$ of the weighing units $10_a$ and $10_b$ are summed by an adder 66 and the resultant sum is applied to a comparator 68. On the other hand, weight signals generated by the weight sensors $16_1$, $16_2$, ... $16_n$ of the weighing units $10_1$, $10_2$, ... $10_n$ are selectively summed by a selective adder circuit 70 controlled by combination control signals generated by a combination generator 72 and the resultant sum weights are successively supplied to a judge circuit 74. The combination generator 72 has outputs 1, 2, ... n corresponding to the weight sensors $16_1$, $16_2$, ... $16_n$, which are coupled also to corresponding inputs of a combination memory 76. In addition to these inputs, the combination memory 76 has a further input terminal 0 which is always provided with a logic high level signal from a suitable source (not shown). The comparator 68 compares the sum weight from the adder 66 with a lower threshold weight (the allowable lower limit of the combined weight) preset in a lower threshold weight register 78 and, when the former is greater than the latter, produces a logic high level signal which is applied through an OR gate 82 to unloading devices $84_a$ and $84_b$ for the weighing hoppers $14_a$ and $14_b$. The unloading device is an electromechanical device which responds to the high level signal to open the gate of the corresponding weighing hopper for a predetermined time to discharge its content and may be of any configuration known to those skilled in the art. The high level signal is also applied through the OR gate 82 and a delay element $86_0$ to a loading device $88_0$. The loading device $88_0$ includes the motor 56 of the constant volume feeding device 18 and, as described previously, responds to the input signal to rotate the volumetric disc 42 by one pitch to supply new articles which have been measured out by volume to the unloaded weighing hoppers $14_a$ and $14_b$. The delay element $86_0$ is used for setting a time difference between the unloading and loading operations and may be of any type known to those skilled in the art.

When the sum weight from the adder 66 is less than the lower threshold weight, the comparator 68 provides a logic low level signal through an invertor 90 to the combination generator 72 as its start signal. In response thereto, the combination generator 72 initiates its operation and supplies its output signals to the selective adder circuit 70. Thus, the selective adder circuit 70 also initiates arithmetic operation under control of the output signals of the combination generator 72. In addition to the weight signals from the weight sensors $16_1$, $16_2$, ... $16_n$, the sum weight from the adder 66 is also applied to the selective adder circuit 70 so that this input from the adder 66 participates always in any combination regardless of the output format of the combination generator 72. This circuit arrangement is described in detail in the above U.S. Pat. No. 4,388,975 and will not be described further. The combined sum outputs of the selective adder circuit 70 are compared with the lower threshold weight preset in the lower threshold weight register 78 and with an upper threshold weight preset in an upper threshold weight register 80 in the judge circuit 74 which provides an acceptance signal to the combination memory 76 when any combined sum falls between the thresholds. The combination memory 76 stores the current input format and also supplies corresponding output signals directly to the unloading devices $84_1$, ... $84_n$, and through delay elements $86_1$, ... $86_n$ to loading devices $88_1$, ... $88_n$. These unloading devices, delay elements and loading devices operate similarly to the abovementioned $84_a$, $84_b$, $86_0$ and $88_0$ and respond to logic high level input signals to unload and load the corresponding weighing units. In this case, the weighing units $10_a$ and $10_b$ are also unloaded and loaded together as described previously, since a high level output signal is applied then to the OR gate 82 from the output terminal 0 of the combination generator 72.

Thus, each batch of articles collected in the collection chute of FIG. 1 and then delivered to the packing machine is rendered to have a volume equal to or greater than the specified value and a weight within the specified range.

Figure 6:
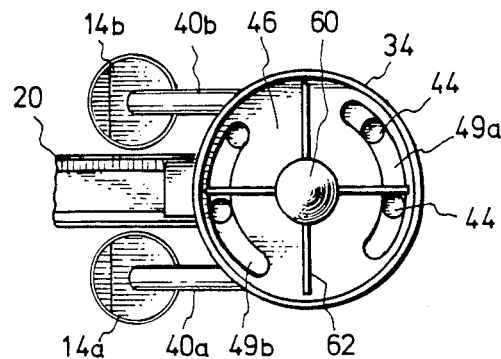
FIGS. 6, 7 and 8 are plan views illustrating another embodiment of the constant volume feeding device of FIG. 2.

Although, in the above embodiment, two weighing units ($10_a$ and $10_b$) were shown to be fed from the constant volume feeding device 18, this is only for illustrative purpose and has no special significance. A single constant volume weighing unit may be used and it may be rather economical since the adder 66 can be omitted. However, it is also true that the more the constant volume weighing units, the less the volumetric error. The volumetric error may be caused by insufficient filling of the volumetric holes 44 of the volumetric disc 42. In order to avoid it, the holes $48_a$ and $48_b$ of the top plate 46 may be substituted with arcuate slots $49_a$ and $49_b$ which can cover a plurality of holes 44, respectively, as shown in FIG. 6. Although, in the above embodiment, the combined weight was assumed to be allowable if it fell within the predetermined range, it is also possible to select out such a combined weight which is equal or nearest to the lower threshold weight. The configuration of the judge circuit 74 for this purpose is disclosed, for example, in U.S. Pat. No. 4,416,341 or U.K. Pat. No. 2,089,153. In general, the target weight condition can be predetermined arbitrarily by designing the comparator 68, judge circuit 74 and their associated circuits so as to meet the requirement and all devices including such modified circuit arrangement are also within the scope of this invention.

When the shape and/or size of the articles are indefinite, a large variance may be anticipated in the weight of each batch delivered from the constant volume feeding device 18. When the weight of each batch is too small (that is, the apparent specific gravity is too small), a greater amount of articles will be added during the combination weighing operation and this may prevent normal prescribed packing from being effected by the associated packing machine. In order to avoid this problem, the feeding machine 30 of FIG. 1 is provided with a crusher 32 for crushing the articles adequately to increase the apparent specific gravity thereof. In order to control this crusher 32 automatically, the arrangement of FIG. 3 also includes a crusher control device comprising a subtracter 92 receiving the outputs of adder 66 and upper threshold weight register 78, a deviation register 94 for storing a predetermined weight deviation threshold, a second subtracter 96 receiving the outputs of deviation register 94 and subtacter 92, and a control circuit 98 receiving the output of subtracter 96. As will be understood, subtracter 92 calculates every cycle the deviation of the weight of the predetermined volume of articles from the lower threshold weight and subtracter 96 calculates the deviation of the above-calculated deviation from the predetermined threshold deviation. The control circuit 98 responds to this deviation from the threshold deviation to provide an adequate control signal for controlling the operation time and/or energy of the crusher 32, depending upon its structure.

Figure 4:
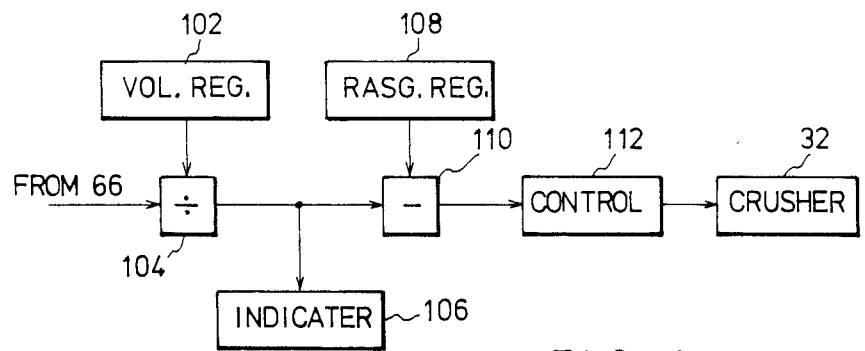
FIG. 4 is a block diagram representing a modification of a part of the circuit arrangement of FIG. 3.

Another embodiment of crusher control device is shown in FIG. 4. This device includes a volume register 102 for storing the total volume of the articles fed to the constant volume weighing units, a divider 104 for dividing the weight output of the adder 66 by the content of volume register 102 to obtain the apparent specific gravity, an RASG register 108 for storing a predetermined reference apparent specific gravity (RASG), a subtracter 110 for calculating the deviation of apparent specific gravity from the stored RASG, and a control circuit 112 for responding to this deviation to control the crusher 32. The above RASG is equal to the quotient of the content of lower threshold weight register 78 divided by the content of volume register 102.

U.S. Pat. No. 4,385,671 and its continuation application Ser. No. 443,959 filed Nov. 23, 1982, or U.K. Pat. No. 2,077,067 discloses a combination weighing machine of so-called "double-shift" type which operates such that, before the weighing units having participated in a specific combination and then been unloaded and loaded reach their stable states, respectively, the next combination is selected from the remaining weighing units, thereby improving working efficiency of the machine. Now, the description will be made about another embodiment in which this invention is applied to this type of combination weighing machine, with reference to FIG. 5.

Figure 5:
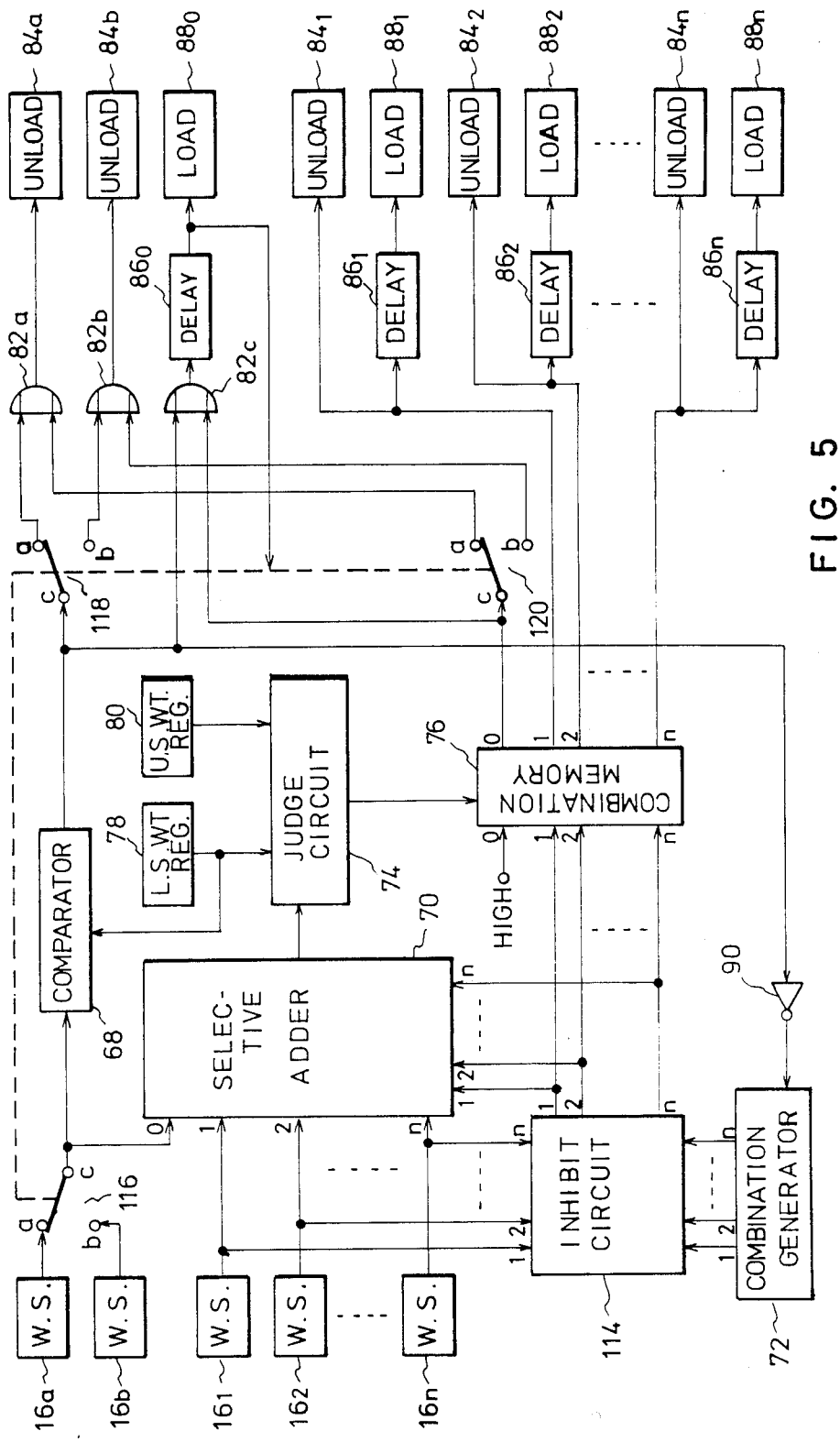
FIG. 5 is a block diagram representing an electrical configuration of another embodiment of the combination weighing machine according to this invention.

The circuit configuration of FIG. 5 is similar to that of FIG. 3, except that an inhibit circuit 114 is coupled between combination generator 72 and selective adder circuit 70 (and combination memory 76). The inhibit circuit 114 receives the weight signals from weight sensors $16_1$, $16_2$, ... $16_n$ to sense loading of specific weighing units from the values thereof and serves to inhibit high level signals from appearing at the corresponding outputs of the combination generator 72 for a predetermined time so that these weighing units do not participate in any combination until they become stable. Accordingly, before stabilization of the weighing units having participated in a combination and having unloaded and loaded again, the next combination operation can be initiated with the remaining weighing units. The inhibit circuit 114 may be actuated in response to the input signals of unloading devices $84_1$, ... $84_n$ or loading devices $88_1$, ... $88_n$ instead of the weight signals from sensors $16_1$, ... $16_n$. Detailed configuration and operation of inhibit circuit 114 will not be described further, since they are described in the abovementioned U.S. or U.K. patent specification.

Further, in this embodiment, a single-pole, double-throw switch 116 is disposed in place of adder 66 of FIG. 1 and its fixed contacts a and b are coupled to the outputs of weight sensors $16_a$ and $16_b$, respectively. The movable contact c of the switch 116 is coupled to one input of comparator 68 and to the "0" input of selective adder circuit 70. The output of comparator 68 is coupled to the movable contact c of a second single-pole, double-throw switch 118, whose fixed contacts a and b are coupled through OR gates $82_a$ and $82_b$, respectively, to unloading devices $84_a$ and $84_b$, and whose movable contact c is coupled through an OR gate $82_c$ and delay element $86_0$ to loading device $88_0$. This high level output terminal 0 of memory 76 is coupled to the movable contact c of a third single-pole, double-throw switch 120 and to the other input of OR gate $82_c$, and the fixed contacts a and b of the switch 120 are coupled respectively to the other inputs of OR gates $82_a$ and $82_b$. The three single-pole, double-throw switches 116, 118 and 120 are thrown concurrently in gang fashion in response to the output signal of delay element $86_0$ (or the input signal of loading device $88_0$), in such fashion that, when the contact a of switch 116 is in use, the contacts a of switches 118 and 120 are also in use.

Assuming now that all switches are in their contacts a, it should be understood the circuit arrangement of FIG. 5 operates similarly to that of FIG. 3, using only constant volume weighing unit $10_a$ (without use of constant volume weighing unit $10_b$). In this condition, if loading of those weighing units which participated in the preceeding combination (including weighing unit $10_a$) is initiated, the input signal of loading device $88_0$ throws switches 116, 118 and 120 to their contacts b at the same time. This results in removal of weighing unit $10_a$ from the next combination and, in co-operation with the abovementioned inhibit circuit 114, the next combination operation can be started immediately with the remaining weighing units which did not participate in the combination. While all switches will return to their contacts a upon completion of the next combination operation, the weighing unit $10_a$ will be in its stable state already and be able to participate in the combination after next.

Figure 7:
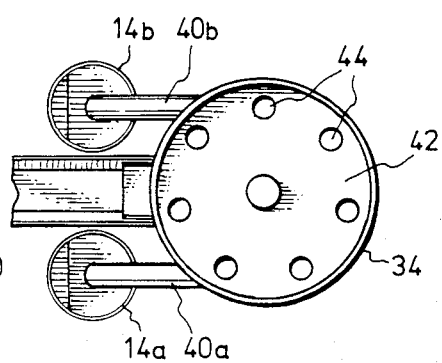
Figure 8:
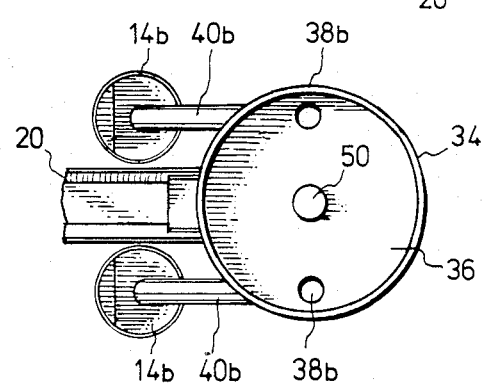

In the arrangement of FIG. 5, in contrast to that of FIG. 3, constant volume weighing units $10_a$ and $10_b$ must be loaded alternately since they are used alternately. This can be done, as shown in FIG. 7 (a plan view of constant volume feeding device 18 from which top plate 46 and overlying components are removed) by making the number of volumetric holes 44 of volumetric disc 42 odd so that the volumetric holes register alternately with holes $38_a$ and $38_b$ of bottom plate 36. The above-described constant volume feeding device 18 was given only for illustrative purpose and any other type of constant volume feeding device can be used for the device of this invention.

We claim:
1. A combination weighing machine, comprising
    (a) at least one first weighing unit for weighing product of allowable minimum volume to produce a first weight signal,
    (b) a plurality of second weighing units for weighing product of arbitrary small volumes as compared with said minimum volume to produce a plurality of second weight signals,
    (c) arithmetic means for generating combinations of said first and second weight signals to select a com- bination the sum of which satisfies a predetermined weight condition, (d) means for unloading and reloading said first and second weighing units of said selected combination;

wherein said machine further comprises (e) means for unloading and reloading only said first weighing unit if said first weight signal satisfies said predetermined weight condition, and (f) means for actuating said arithmetic means to select said combination if said first weight signal does not satisfy the predetermined weight condition, said means for unloading and reloading said first and second weighing units being operable after said combination is selected to unload respective first and second weighing units of said selected combination.

2. A combination weighing machine, comprising (a) a pair of first weighing units for weighing product of allowable minimum volume to produce a pair of first weight signals, (b) a plurality of second weighing units for weighing product of arbitrary small volumes as compared with said minimum volume to produce a plurality of second weight signals, (c) arithmetic means for generating combinations of one of said first weight signals and said second weight signals to select a combination the sum of which satisfies a predetermined weight condition, (d) means for unloading and reloading said first and second weighing units of the selected combination;

wherein said machine further comprises (e) means for unloading and reloading said one first weighing unit if the corresponding first weight signal satisfies the predetermined weight condition, (f) means for actuating said arithmetic means to select said combination if said first weight signal does not satisfy the predetermined weight condition, said means for loading and reloading said first and second weighing units being operable after said combination is selected to unload respective first and second weighing units of said selected combination, and (g) means for inhibiting the second weighing units of a selected combination from participating in the combination operation of said arithmetic means for a predetermined period of time after said units have unloaded and reloaded.

3. A product feeding device for the combination weighing machine according to claim 1 or 2, comprising a constant volume feeding device for feeding product of allowable minimum volume to said first weighing unit, means for dividing the weight signal of said first weighing unit by said volume to calculate an apparent specific gravity, and an indicator for indicating a value representative of said apparent specific gravity.

4. A product feeding device according to claim 3, further comprising means for crushing said product, and control means for controlling said crushing means based upon said first weight signal or said apparent specific gravity.

5. A method of delivering quantities of product with each quantity satisfying predetermined weight and volume conditions, utilizing at least one first weighing unit and a plurality of second weighing units, each unit being adapted for unloading of product therefrom to contribute to a delivery, said method comprising:

(a) weighing product of allowable minimum volume by said first weighing unit to produce a first weight signal representative of said allowable minimum volume and, at the same time, weighing product of arbitrary small volumes as compared with said minimum volume by each of said second weighing units to produce a plurality of second weight signals, (b) unloading and reloading said first weighing unit if said first weight signal satisfies said predetermined weight condition, (c) generating combinations of said first and second weight signals to select a combination the sum of which satisfies said predetermined weight condition and then unloading and reloading said first and second weighing units of said selected combination, if said first weight signal does not satisfy said predetermined weight condition.

6. A method of delivering quantities of product with each quantity satisfying predetermined weight and volume conditions, utilizing a pair of first weighing units and a plurality of second weighing units, each unit being adapted for unloading of product therefrom to contribute to a delivery, said method comprising for each delivery the steps of:

(a) weighing product of allowable minimum volume by one of said pair of first weighing units to produce a first weight signal and, at the same time, weighing product of arbitrary small volumes as compared with said minimum volume by said second weighing units to produce a plurality of second weight signals, (b) unloading and reloading said one first weighing unit if said first weight signal satisfies said predetermined weight condition, and (c) generating combinations of said first and second weight signals to select a combination the sum of which satisfies said predetermined weight condition and then unloading and reloading said first and second weighing units of said selected combination, if said first weight signal does not satisfy said predetermined weight condition, wherein, for successive deliveries, said first weighing units are used on an alternating basis, and wherein the combination generation step for one delivery is carried out before the weighing units which were unloaded on the preceding delivery are loaded again and reach stabilization.

7. A combination weighing machine comprising:

(a) at least one first weighing unit for weighing product of a predetermined minimum volume to produce a first weight signal;

(b) a plurality of second weighing units for weighing product of relatively small volumes compared to said predetermined minimum volume to produce a plurality of second weight signals;

(c) arithmetic means for generating combinations of said first and second weight signals to select a combination having a sum value which satisfies a predetermined weight condition;

(d) unloading means for unloading said first and second weighing units, said unloading means being operable for unloading only said first weighing unit if said first weight signal satisfies said predetermined weight condition; and (e) means for actuating said arithmetic means to select said combination if said first weight signal does not satisfy said predetermined weight condition, said unloading means being operable after said combination is selected to unload respective first and second weighing units of said selected combination.

8. A combination weighing machine as set forth in claim 7 further comprising means for inhibiting the second weighing units of a selected combination from participating in the combination operation of said arithmetic means for a period of time after said units have unloaded and reloaded.

9. A product feeding device for the combination weighing machine of claim 7 or 8, comprising means for feeding a substantially constant minimum volume of product to said first weighing unit, means for dividing the first weight signal of said first weighing unit by said constant volume to calculate an apparent specific gravity of the product, and means for indicating a value representive of said apparent specific gravity.

10. A product feeding device as set forth in claim 9 further comprising means for crushing said product and means for controlling said crushing means to crush said product when said apparent specific gravity falls below a predetermined level.

11. A method of delivering quantities of product with each quantity satisfying predetermined weight and volume conditions, utilizing at least one first weighing unit adapted for weighing product of a predetermined minimum volume to produce a first weight signal, and a plurality of second weighing units adapted for weighing product of relatively small volumes compared to said predetermined minimum volume to produce a plurality of second weight signals, each unit being adapted for unloading of product therefrom, said method comprising for each delivery the steps of:

(a) effecting operation of said first weighing unit to weight said predetermined minimum volume of product to produce said first weight signal;
(b) effecting operation of said second weighing units to weigh said relatively small volumes to produce said second weight signals;
(c) unloading said first weighing unit to produce a delivery if said first weight signal satisfies said first weight condition; and
(d) if said first weight signal does not satisfy said predetermined weight condition, generating combinations of said first and second weight signals to select a combination the sum of which satisfies said weight condition, and then unloading the weighing units of said selected combination to produce a delivery.

12. A method as set forth in claim 11, further comprising, for successive deliveries, initiating said combination generation step before the weighing unit or units which were selected on the preceding delivery have reloaded and stabilized.

13. A method as set forth in claim 11 wherein a pair of first weighing units are utilized, said method further comprising alternating the use of said first weighing units for successive deliveries.

14. A method as set forth in claim 11 further comprising the steps of feeding a substantially constant volume of product to said first weighing unit and dividing the weight signal of said first weighing unit by said substantially constant volume to calculate an apparent specific gravity of the product.

15. A method as set forth in claim 14 further comprising crushing the product fed to said first weighing unit if said apparent specific gravity of the product is below a predetermined value.

* * * * *